(12) United States Patent
Patel et al.

(10) Patent No.: US 10,541,634 B2
(45) Date of Patent: Jan. 21, 2020

(54) GENERATOR ARRANGEMENTS AND METHODS OF CONTROLLING GENERATOR ARRANGEMENTS

(71) Applicant: Hamilton Sundstrand Corporation, Charlotte, NC (US)

(72) Inventors: Dhaval Patel, Loves Park, IL (US); Jonathan C. Dell, Carpentersville, IL (US); Andreas C. Koenig, Rockford, IL (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 57 days.

(21) Appl. No.: 15/462,194

(22) Filed: Mar. 17, 2017

(65) Prior Publication Data

US 2018/0269817 A1   Sep. 20, 2018

(51) Int. Cl.
 *H02P 9/06*   (2006.01)
 *H02P 9/48*   (2006.01)

(52) U.S. Cl.
 CPC . *H02P 9/06* (2013.01); *H02P 9/48* (2013.01)

(58) Field of Classification Search
 CPC .................................. H02P 9/06; H02P 9/48
 See application file for complete search history.

(56) References Cited

U.S. PATENT DOCUMENTS

| | | | | |
|---|---|---|---|---|
| 4,278,928 A | * | 7/1981 | Griffiths | H02K 7/10 322/29 |
| 4,992,920 A | * | 2/1991 | Davis | H02J 7/1438 322/32 |
| 6,133,716 A | * | 10/2000 | Schutten | H02J 9/066 290/30 A |
| 6,777,822 B1 | * | 8/2004 | Suttie | F02C 9/26 290/40 A |
| 8,866,449 B1 | | 10/2014 | Rozman et al. | |
| 2003/0067793 A1 | * | 4/2003 | Shimazaki | H02M 5/458 363/97 |
| 2005/0180862 A1 | * | 8/2005 | Lando | H02P 9/302 417/316 |
| 2010/0078938 A1 | * | 4/2010 | Coons | H02J 3/28 290/7 |

(Continued)

FOREIGN PATENT DOCUMENTS

| EP | 2990610 A1 | 3/2016 |
|---|---|---|
| EP | 3023601 A1 | 5/2016 |

OTHER PUBLICATIONS

Extended European Search Report dated Jun. 28, 2018, issued during the prosecution of European Patent Application No. 18162145.9 (8 pages).

*Primary Examiner* — Viet P Nguyen

(74) *Attorney, Agent, or Firm* — Locke Lord LLP; Scott D. Wofsy; Judy R. Naamat

(57) ABSTRACT

A generator arrangement includes a stator with armature winding, a rotor with one or more permanent magnets supported for rotation relative to the stator, a variable speed drive, and a control module. The variable speed drive is connected to the rotor for rotating the rotor within a predetermined speed range. The control module is disposed in communication with the armature windings and is operatively connected to the variable speed drive to maintain constant output voltage as load changes by varying rotational speed of the rotor.

19 Claims, 5 Drawing Sheets

(56) References Cited

U.S. PATENT DOCUMENTS

| | | | | |
|---|---|---|---|---|
| 2011/0140421 A1* | 6/2011 | Scholte-Wassink | ..... | H02K 3/28 |
| | | | | 290/44 |
| 2011/0221191 A1* | 9/2011 | Fiset | ........................ | H02K 7/20 |
| | | | | 290/5 |
| 2012/0032504 A1* | 2/2012 | Akimasa | ............... | H01M 10/44 |
| | | | | 307/9.1 |
| 2012/0319661 A1* | 12/2012 | Moore | .................... | F16H 3/724 |
| | | | | 322/40 |
| 2013/0278308 A1* | 10/2013 | Larsen | ...................... | H02P 9/00 |
| | | | | 327/156 |
| 2014/0001770 A1* | 1/2014 | Long | ........................ | F02D 29/06 |
| | | | | 290/40 B |
| 2015/0042293 A1* | 2/2015 | Hehenberger | ........ | F03D 7/0244 |
| | | | | 322/21 |
| 2015/0078917 A1* | 3/2015 | Torrey | ................ | F04D 15/0066 |
| | | | | 417/42 |
| 2015/0270798 A1 | 9/2015 | Chem et al. | | |
| 2015/0357952 A1* | 12/2015 | Taylor | ...................... | H02P 9/04 |
| | | | | 290/40 C |
| 2016/0130970 A1 | 5/2016 | Blazer et al. | | |

\* cited by examiner

GENERATOR ARRANGEMENTS AND METHODS OF CONTROLLING GENERATOR ARRANGEMENTS

BACKGROUND OF THE INVENTION

1. Field of the Invention

The present disclosure relates to electrical systems, and more particularly to generators for aircraft electrical systems.

2. Description of Related Art

Electrical systems such as those carried by aircraft commonly employ three stage wound field synchronous generators. The first stage is typically a permanent magnet generator, which is used to supply excitation to the exciter. The second stage is the exciter, which is used to brushless excite the main machine rotor. The third stage is the main machine, which is used to generate power according to excitation applied by the exciter and provide power to the electrical system. The permanent magnet generator, exciter, and main machine are typically operably connected to a common shaft for common rotation with one another.

During operation the output voltage of the main machine can be held constant up to a certain current level, typically up to about twice the rated output of the generator, and thereafter droop rapidly in a short-circuit fault condition. Control of the generator is typically provided by a generator control unit, which is powered by the permanent magnet generator and arranged to control power communicated to the exciter to maintain an output voltage target as output current varies according to the electrical load carried by the generator.

Such conventional methods and systems have generally been considered satisfactory for their intended purpose. However, there is still a need in the art for improved generator arrangements. The present disclosure provides a solution for this need.

SUMMARY OF THE INVENTION

A generator arrangement includes a stator with a armature winding, a rotor with one or more permanent magnets supported for rotation relative to the stator, a variable speed drive, and a control module. The variable speed drive is connected to the rotor for rotating the rotor within a predetermined speed range. The control module is disposed in communication with the armature windings and is operatively connected to the variable speed drive to maintain constant output voltage as load changes by varying rotational speed of the rotor.

In certain embodiments the generator arrangement can be a single stage generator arrangement. The generator arrangement can include a permanent magnet generator. The permanent magnet generator can include one or more permanent magnets carried by a rotor. One or more of the permanent magnets can be arranged on a surface of the rotor or embedded within the rotor. The generator arrangement can be an exciterless generator arrangement, the rotor carrying neither excitation windings nor a rotating rectifier circuit.

In accordance with certain embodiments, a power converter can be arranged to convert variable frequency current into constant frequency alternating current (AC) power or direct current (DC) power. The generator arrangement can include a speed sensor. The speed sensor can be coupled to the rotor and disposed in communication with the control module to provide a signal indicative to rotational speed of the rotor to the control module. The speed sensor can include a resolver. The speed sensor can include a position sensing permanent magnet generator. The speed sensor can include a Hall Effect sensor. The sensor can include a magnetic pickup.

It is contemplated that the generator arrangement can include a voltage sensor. The voltage sensor can be disposed in communication with the control module and arranged to provide thereto a signal indicative of output voltage of the generator arrangement. The voltage sensor can be arranged between the armature windings and a power converter connected to the armature windings. The voltage sensor can be arranged between the power converter and an electrical load connected to the armature windings by the power converter. The generator arrangement can include a current sensor. The current sensor can be disposed in communication with the control module and arranged to provide thereto a signal indicative of load on the generator arrangement. The current sensor can be arranged between the armature windings and a power converter connected to the armature windings. The current sensor can be arranged between the power converter and an electrical load connected to the armature windings by the power converter.

It is also contemplated that a gas turbine engine can be coupled to the variable speed drive to provide input rotation to the generator arrangement. The generator arrangement can include an integrated drive generator arrangement. The variable speed drive can include an epicyclic differential. The epicyclic differential can be coupled to the rotor convert variable speed input rotation to variable generator rotation speed. The gas turbine engine can be coupled to the epicyclic differential. The control module can be operatively connected to the epicyclic differential such that speed of the generator rotor is independently variable relative to input rotation.

It is further contemplated that, in accordance with certain embodiments, the variable speed drive can include a hydraulic pump and motor set. The hydraulic pump and motor set can be coupled to the rotor and arranged to vary rotor rotational speed according to input variation in input rotational speed input and a predetermined output voltage target. The control module can be operably connected to the hydraulic pump and motor set, and can be arranged to drive output voltage to the output voltage target within about two times the rated current output of the generator arrangement. The control module can be arranged to allow the output voltage to droop when the load current exceeds more than twice the rated current output of the generator arrangement.

A method of controlling a generator arrangement includes rotating a rotor with one or more permanent magnets relative to a stator and generating electric current in armature windings fixed relative to the stator. The voltage of the electric current generated in the armature windings is sensed and difference determined between the sensed voltage and a target output voltage. Rotational speed of the rotor is changed when the difference between the sensed voltage and the target output voltage is outside of a predetermined voltage range including the target voltage.

In certain embodiments, variable speed input rotation can be received at the generator arrangement. The rotational speed of the rotor can be changed to compensate for change in the variable speed input rotation to maintain the target output voltage within the predetermined voltage range. The rotational speed of the rotor can be changed to compensate for change in the electrical load applied to the generator arrangement to maintain the target output voltage within the predetermined voltage range. The rotational speed of the rotor can be changed to compensate for both change in the variable speed input rotation and change in the electrical load applied to the generator arrangement to maintain the target output voltage within the predetermined voltage range. It is contemplated that the electric current induced in the windings can be converted into constant frequency AC power or DC power.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
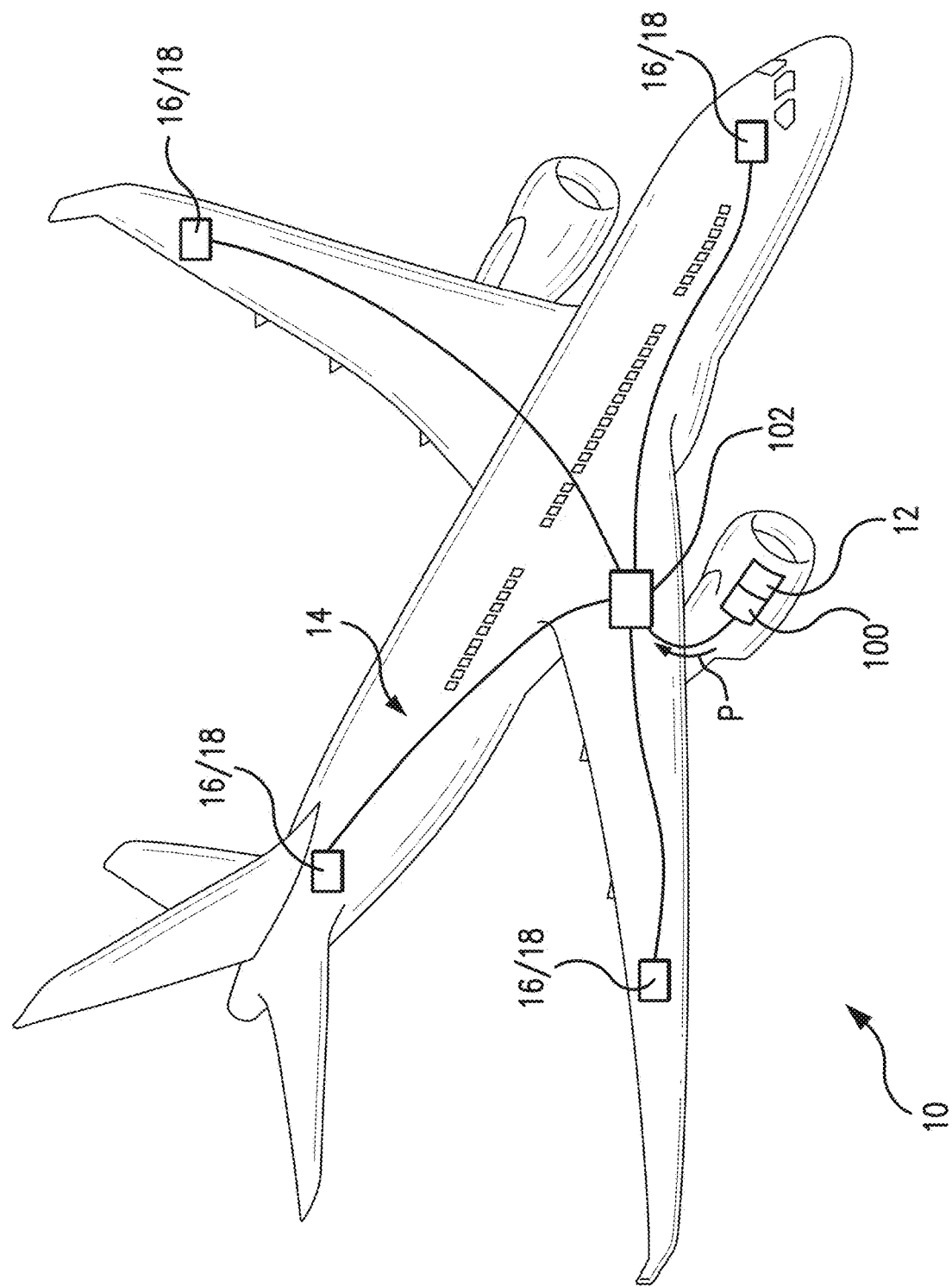
FIG. 1 is a schematic view of an exemplary embodiment of a generator arrangement constructed in accordance with the present disclosure, showing a gas turbine engine and power converter connected to the generator arrangement.

Reference will now be made to the drawings wherein like reference numerals identify similar structural features or aspects of the subject disclosure. For purposes of explanation and illustration, and not limitation, a partial view of an exemplary embodiment of a generator arrangement in accordance with the disclosure is shown in FIG. 1 and is designated generally by reference character 100. Other embodiments of generator arrangements and methods of controlling generator arrangements in accordance with the disclosure, or aspects thereof, are provided in FIGS. 2-5, as will be described. The systems and methods described herein can be used for providing constant frequency alternating current (AC) power or direct current (DC) power in vehicles, such as aircraft, though the present disclosure is not limited to aircraft or to vehicular power systems in general.

Referring to FIG. 1, an aircraft 10 is shown. Aircraft 10 includes a gas turbine engine 12, generator arrangement 100, a power converter 102, a power distribution system 14, and a plurality of power-consuming devices 16/18. Gas turbine engine 12 can be a main engine or an auxiliary power unit and is operably connected to provide input rotation $R_1$ (shown in FIG. 2) to generator arrangement 100. Generator arrangement 100 is connected to power converter 102 and is arranged to convert input rotation $R_1$ (shown in FIG. 2) received from gas turbine engine 12 in to electrical power P, which generator arrangement 100 provides to power converter 102.

Power converter 102 is connected to power distribution system 14 and is arranged to convert electrical power P received from generator arrangement 100 into power suitable for power-consuming devices 16/18, e.g., constant frequency AC power or high voltage DC power, which power converter applies to power distribution system 14. Power distribution system 14 in turn connects power-consuming devices 16/18 to power converter 102 for providing power received from power converter 102 to power-consuming devices 16/18. It is contemplated that power-consuming devices 16/18 can include one or more device requiring constant frequency AC power, DC power, and/or high voltage DC power, as suitable for an intended application.

Figure 2:
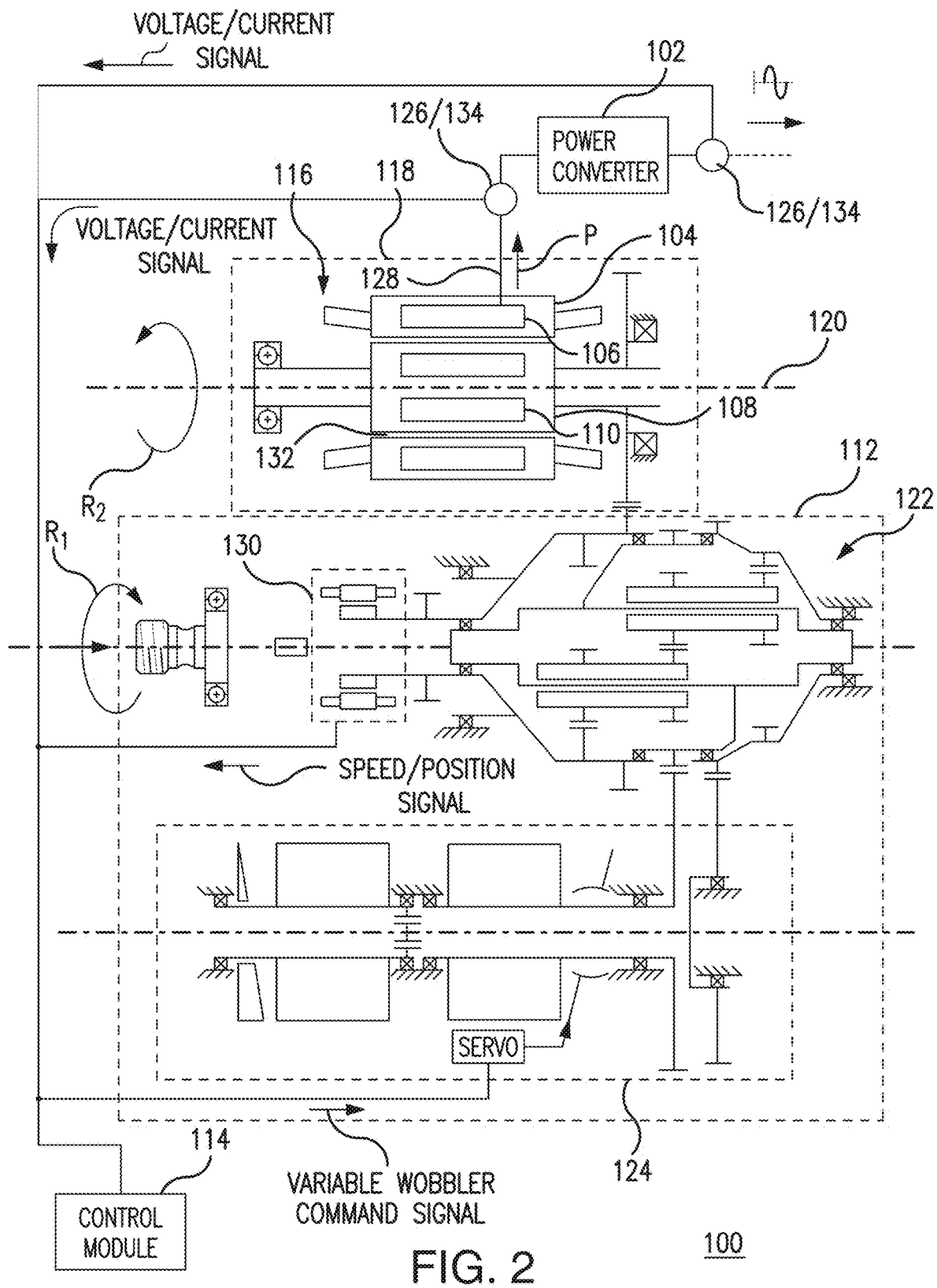
FIG. 2 is a schematic view of the generator arrangement of FIG. 1, showing a permanent magnet generator connected to a variable speed drive.

With reference to FIG. 2, generator arrangement 100 is shown. Generator arrangement 100 includes a stator 104 with one or more armature winding 106, a rotor 108 with one or more permanent magnets 110 supported for rotation relative to stator 104, a variable speed drive 112, and a control module 114. Variable speed drive 112 is connected to rotor 108 for rotating rotor 108 within a predetermined speed range (shown in FIG. 4). Control module 114 is disposed in communication with the one or more armature winding 106 and is operatively connected to variable speed drive 112 to maintain a predetermined output voltage (shown in FIG. 4) as electrical load, e.g., power drawn by power consuming devices 16/18 (shown in FIG. 1), changes by varying rotational speed $R_2$ of rotor 108.

Generator arrangement 100 includes a single stage 116. Single stage 116 includes a permanent magnet generator 118 having permanent magnets 110 and one or more armature winding 106. Permanent magnets 110 are fixed to rotor 108 and are supported for rotation about a generator rotation axis 120 such that, as rotor 108 rotates about generator rotation axis 120, a persistent magnetic field generated by permanent magnets 110 induces electric current in the one or more armature windings 106. The current has a voltage and frequency which varies according the magnitude of the electrical load connected to one or more armature windings 106 and rotational speed $R_2$ of rotor 108. The one or more armature windings 106 are in turn connected to power converter 102 and provide electric power P with constant voltage thereto. Power converter 102 converts the current flow into constant frequency AC power (illustrated with an exemplary sine wave) or DC power suitable for power-consuming devices 16/18 (shown in FIG. 1).

Figure 3A:
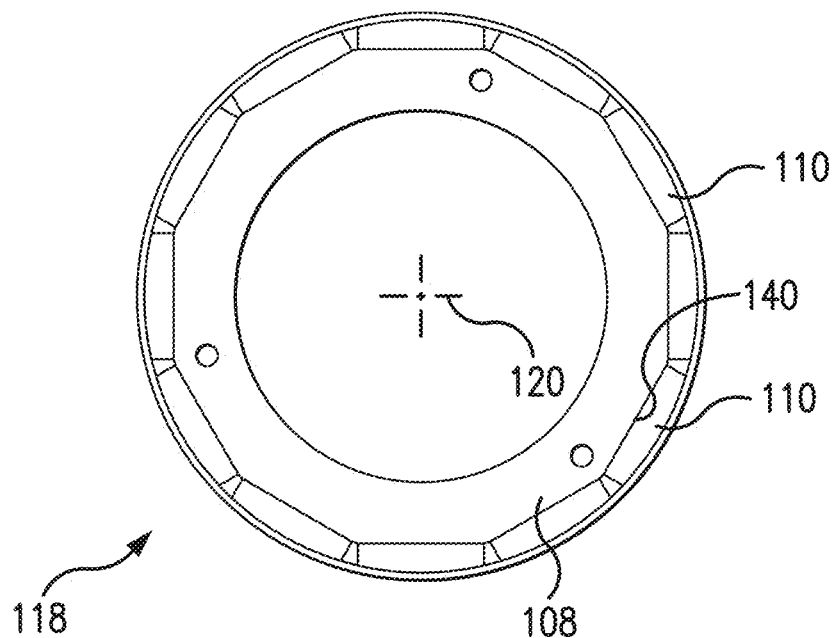
FIGS. 3A and 3B are cross-sectional views of embodiments of a permanent magnet generator of the generator arrangement of FIG. 1, showing permanent magnets carried by a generator rotor on the rotor surface in one embodiment and permanent magnets embedded within an rotor interior in another embodiment, respectively.

With reference to FIG. 3A, a portion of permanent magnet generator 118 is shown is show according to an exemplary embodiment. Permanent magnet generator 118 includes rotor 108 having a radially outer (relative to generator rotation axis 120) surface 140. Permanent magnets 110 are affixed to radially outer surface 140 proximate a gap 132 defined between rotor 108 and stator 104 (shown in FIG. 2). Close proximity of permanent magnets 110 relative to stator 104 reduces the size of permanent magnets necessary to develop a given amount of magnetic flux due to an absence of material which could otherwise attenuate or distort the magnet flux generated by permanent magnets 110.

Figure 3B:
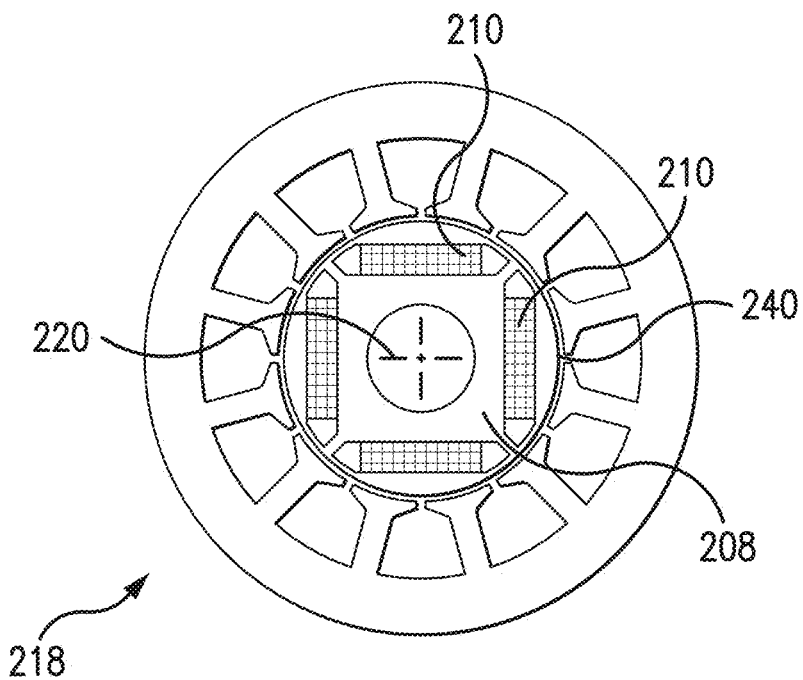

Referring to FIG. 3B, a portion of an alternate embodiment of a permanent magnet generator, i.e. a permanent magnet generator 218, is shown. Permanent magnet generator 218 is similar to permanent magnet generator 118 (shown in FIG. 3A) and additionally includes embedded permanent magnets 210. Permanent magnets 210 are arranged between generator rotation axis 220 and radially outer surface 240 of a rotor 208, i.e. within an interior of rotor 208. Arranging permanent magnets 210 within the interior of rotor 208 can reduce the stress imposed on the rotor structure by permanent magnets 210 as the centrifugal force associated with the radially inner position of permanent magnets 210 is lower than were permanent magnets 210 affixed to radially outer surface 240.

With continuing reference to FIG. 2, variable speed drive 112 includes an epicyclic differential 122 and a hydraulic pump and motor set 124. Epicyclic differential 122 is arranged to receive input rotation $R_1$ from a source of mechanical rotation, e.g., gas turbine engine 12 (shown in FIG. 1), and communicate input rotation $R_1$ to rotor 108 as $R_2$. Hydraulic pump and motor set 124 is connected to epicyclic differential 122 and is arranged to control the ratio of $R_1$ to $R_2$, thereby allowing permanent magnet generator 118 to receive input rotation and rotate and at a speed which independent of the speed of input rotation $R_1$. It is contemplated that variable speed drive 112 can be arranged within a common housing with permanent magnet generator 118 in an integrated drive generator arrangement, thereby reducing the number of line replacement units in the configuration of aircraft 10 (shown in FIG. 1). In certain embodiments, rotation from gas turbine engine 12 (shown in FIG. 1) is communicated via an accessory gearbox, facilitating integration of generator arrangement 100 into legacy aircraft configurations.

Control module 114, e.g., a generator control unit, is operably connected to hydraulic pump and motor set 124 and is disposed in communication with armature winding 106 and epicyclic differential 122. In this regard generator arrangement 100 is connected to one or more of a voltage sensor 126, a current sensor 134 and a rotational speed sensor 130. Communication is by way of a lead 128, whereby one or more of voltage sensor 126, current sensor 134 and rotational speed sensor 130 provide signal(s) indicative of output voltage, electrical load, and input rotational speed to generator arrangement 100.

Voltage sensor 126 is disposed in communication with control module 114 and is arranged to provide thereto a signal indicative of output voltage of generator arrangement 100. Voltage sensor 126 can be arranged between armature windings 106 and power converter 102, which is connected to armature windings 106. Voltage sensor 126 can be arranged between power converter 102 and electrical load 16/18, which is connected armature windings 106 by power converter 102. It is contemplated that control module 114 sense voltage of electric current generated in armature windings 106 using the signal provided by voltage sensor 126, determine a difference between the sensed voltage (shown in FIG. 4) and a target output voltage (shown in FIG. 4) of generator arrangement 100, and change rotational speed of rotor 108 based on difference between the sensed voltage and target output voltage when the difference is outside of a predetermined range, e.g., +/−10% of target output voltage.

Current sensor 134, which is optional, is disposed in communication with control module 114 and arranged to provide thereto a signal indicative of electrical load on generator arrangement 100. Current sensor 134 can be arranged between armature windings 106 and power converter 102. Current sensor 134 can also be arranged between power converter 102 and electrical load 16/18 (shown in FIG. 1). It is contemplated that control module 114 sense electrical load using the signal provided by current sensor 134 and change rotational speed of rotor 108 based on change in the electrical to maintain difference between the sensed voltage and target output voltage within the predetermined output voltage range.

Rotational speed sensor 130 is coupled to variable speed drive 112, e.g., to a shaft receiving input rotation $R_1$ to epicyclic differential 122, rotational speed sensor 130 and arranged to provide a signal indicative of rotational position and rotational speed of generator arrangement 100 to control module 114. In the illustrated exemplary embodiment, rotational speed sensor 130 includes a position sensing permanent magnet generator, a resolver device, Hall Effect sensor, magnetic pickup, or any other speed sensing device suitable for an intended application. Based on the voltage signal received from current or voltage sensor 126 and the speed/position signal received from rotational speed sensor 130, control module 114 operatively control variable speed drive 112 via a hydraulic pump and motor set command signal, which alters generator rotational speed $R_2$ to drive output voltage of permanent magnet generator 118 to a predetermined output voltage target. Control may be, for example, via a servo disposed in communication with control module 114 and operably connected to hydraulic pump and motor set 124.

During operation rotor 108 is rotated such that the one or more permanent magnets 110 generate, i.e., induce, generating electric current in armature windings 106. Voltage of the current is sensed using voltage sensor 126 and difference determined between the sensed voltage and a target output voltage. Based on the difference, rotational speed of rotor 108 is changed when the difference between the sensed voltage and the target output voltage is outside of a predetermined voltage range including the target voltage, thereby allowing regulation generator arrangement 100 through change to rotational speed of rotor 108.

Change to rotational speed of rotor 108 can be independent of change in variable speed input rotation received at generator arrangement 100. In this respect the rotational speed of rotor 108 can be changed to compensate for change in the variable speed input rotation to maintain the target output voltage within the predetermined voltage range. The rotational speed of rotor 108 can be changed to compensate for change in the electrical load applied (or carried) by generator arrangement 100 to maintain the target output voltage within the predetermined voltage range. It is also contemplated that, in accordance with certain embodiments, the rotational speed of rotor 108 can be changed to compensate for both change in the variable speed input rotation and change in the electrical load applied to generator arrangement 100 to maintain the target output voltage within the predetermined voltage range.

In the illustrated exemplary embodiment generator arrangement 100 is exciterless. In this respect there is no exciter in communication with rotor 108 to provide electrical power thereto. There is also no excitation winding carried by rotor 108 and disposed in communication with permeant magnets 110 for modulating magnetic flux communicated therefrom to the one or more armature windings 106. Further, there is also no rotating rectifier circuitry carried by rotor 108. This improves the efficiency of generator arrangement 100 by removing devices which could otherwise impose an efficiency loss on a conventional generator arrangement having excitation windings, rotating rectifier circuitry, and/or an exciter to communicate power to a rotor. As will be appreciated by those of skill in the art in view of the present disclosure, permanent magnets, e.g., permanent magnets 110, typically have a fixed strength. In addition, constant rotational speed permanent magnet generators typical exhibit decreased output voltage as electrical load connected to the generator increases. Since an electrical load serviced by generator arrangement 100 can require constant voltage within a predetermined load range, generator arrangement 100 includes variable speed drive 112 and control module 114.

Figure 4:
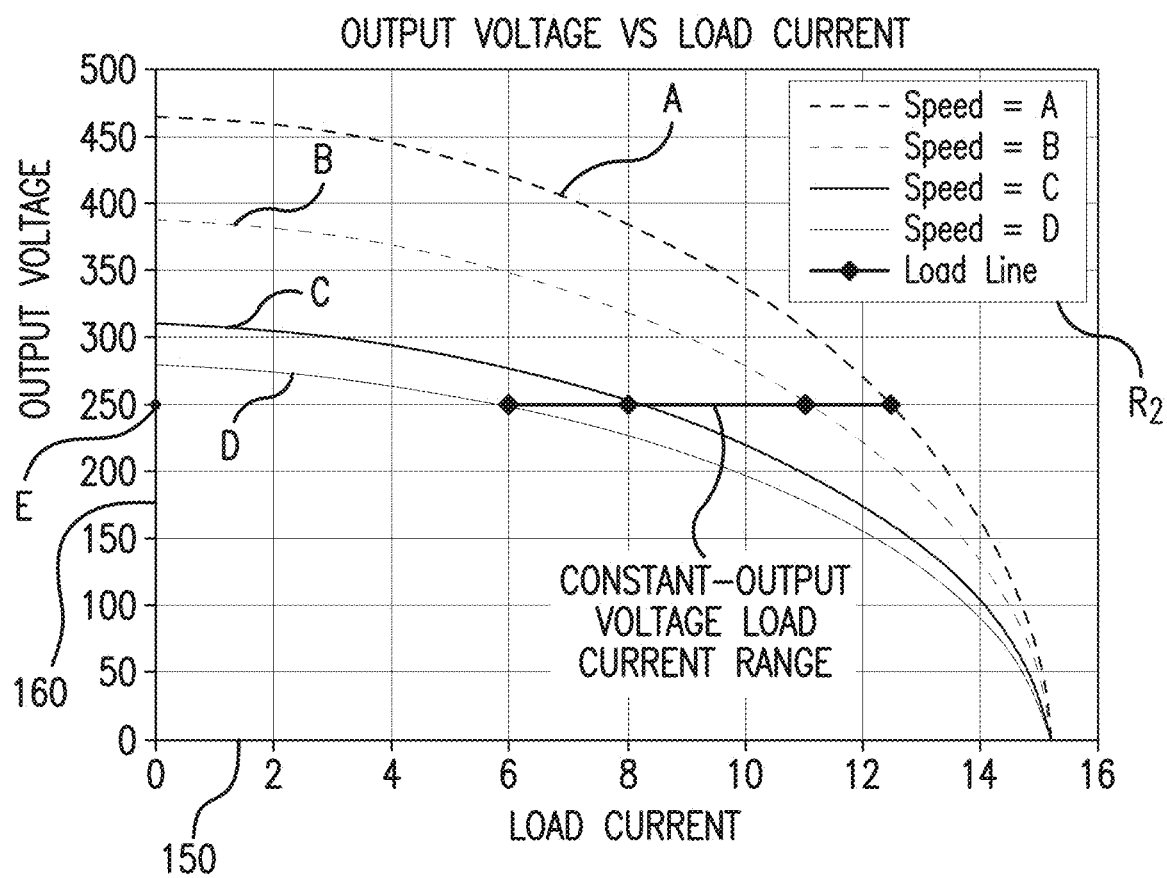
FIG. 4 is a graph of load versus output voltage for the generator arrangement of FIG. 1, showing output voltage being driven to a target output voltage within a rated load range by controlling rotational speed of the generator arrangement.

With reference to FIG. 4, a chart of output voltage versus load current is shown for a generator arrangement with a permanent magnet generator, e.g., generator arrangement 100 (shown in FIG. 1). Load current is shown on axis 150 and varies according to the current demand of power-consuming devices, e.g., power consuming devices 16/18 (shown in FIG. 1), imposed on generator arrangement 100 (shown in FIG. 1). Output voltage of generator arrangement 100 is shown on axis 160. Four exemplary output voltage: load current curves, i.e., curves A-D, are illustrated in the graph, each curve showing output voltage dropping as load current increases for a given rotational speed, rotational speed of exemplary curve C being greater than the rotational speed of exemplary curve D; rotational speed of exemplary curve B being greater than the rotational speed of exemplary curve C; and rotational speed of exemplary curve A being greater than the rotational speed of exemplary curve B for selected rotational speeds. Notably, each exemplary curve has a single load current associated with a particular output voltage, e.g., output voltage E.

By throttling the generator rotational speed $R_2$, an output voltage profile for generator arrangement 100 (shown in FIG. 1) that is substantially flat can be synthesized over a predetermined range of load currents. In the illustrated exemplary chart output voltage is maintained at 250 volts over a load current range of 6 to 12 amps by throttling generator rotational speed $R_2$ between about 10,800 RPM and about 18,000 RPM. This provides output voltage regulation within a load current range comparable to that of an excited generator arrangement, i.e. a generator arrangement with three stages, with a single stage, thereby realizing similar (or identical) power generation performance with increased efficiency.

Figure 5:
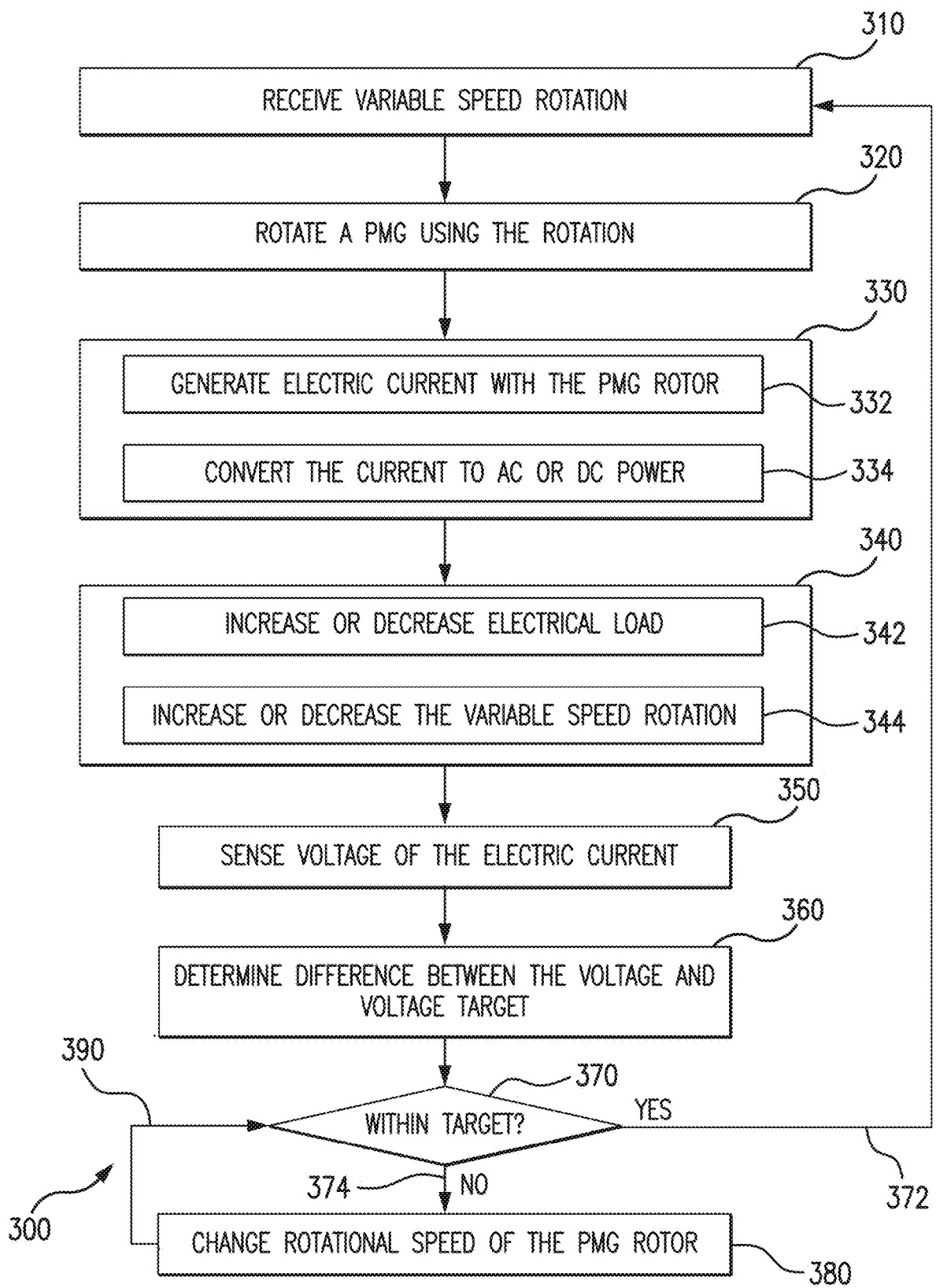
FIG. 5 is flow chart of a method of controlling a generator arrangement, showing steps of the method.

With reference to FIG. 5, a method 300 of controlling a generator arrangement, e.g., generator arrangement 100 (shown in FIG. 1), is shown. Method 300 includes receiving variable speed input rotation at a generator arrangement, e.g., variable speed input rotation $R_1$ (shown in FIG. 2) at generator arrangement 100 (shown in FIG. 1), as shown with box 310. A permanent magnet generator rotor, e.g., rotor 108 (shown in FIG. 2), is rotated using the variable speed input rotation received at the generator arrangement, as shown with box 320. The variable speed input rotation is converted to a rotor rotational speed via a variable speed drive, e.g., rotation $R_2$ (shown in FIG. 2) using variable speed drive 112, as shown with box 330, to generate electric current in armature windings fixed relative the rotor, e.g., power P (shown in FIG. 1) and in armature windings 106 (shown in FIG. 2), as shown with box 332. It is contemplated that the electric current can be converted to constant frequency AC power or DC power, as shown with box 334.

As the rotor is rotated relative to the armature windings to generator electric current the voltage of the electric current is sensed using a voltage sensor, e.g., voltage sensor 126 (shown in FIG. 2), as shown with box 350. The sensed voltage is compared to a voltage target, as shown with box 360, and a difference determined between the output voltage and the voltage target, as shown with box 370. When the output voltage is within a selected voltage range including the voltage target the rotor rotation speed is left unchanged, as shown with arrow 372. When the output voltage is outside of the selected voltage range the rotational speed of the rotor is changed, as shown with arrow 374 and box 380. Rotor speed can be continually adjusted to drive output voltage to the output voltage target, as shown with arrow 390.

It is contemplated that the rotor speed can be changed in response of increase or decrease in the electrical load connected to the generator arrangement to maintain the output voltage within the voltage range, as shown with box 342. It is also contemplated that the rotor speed can be changed in response of increase or decrease in the input rotational speed received by the generator arrangement to maintain the output voltage within the voltage range, as shown with box 344. In accordance with certain embodiments, it is additionally contemplated that rotor speed can be changed in response of increase or decrease in the electrical load connected to the generator arrangement and in response of increase or decrease in the input rotational speed received by the generator arrangement to maintain the output voltage within the voltage range, as shown with box 340.

In embodiments described herein generator arrangements are provided with relatively high efficiency due to the elimination of components found in certain types of generators, such as the permanent magnet generator used to provide excitation power, the exciter, and excitation windings. In certain embodiments the generator can have a relatively high pole count, allowing for reduction in the size of the power electronics if the machine is a VSCF or HVDC system. In accordance with certain embodiments, the generator arrangement can be relatively reliable due to the reduction of components otherwise incorporated in multi-stage generator arrangements.

It is contemplated the generator control module can be relatively simple, the control module requiring only a rectifier and a power to actuate a servo valve controlling the hydraulic pump and motor set. It is also contemplated that improved generator output control be provided by controlling PMG rotation in a single-stage generator arrangement as compared to excitation in multi-stage generator arrangements during intervals when the generator is operated above the generator power unit (PU) rating, e.g., between about 1.5 and about 2.0 times the generator PU rating.

The methods and systems of the present disclosure, as described above and shown in the drawings, provide for generator arrangements and methods of controlling generator arrangements with superior properties which present alternatives to variable frequency, constant frequency, and high voltage DC power systems which require fully controlled voltage output. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A generator arrangement, comprising:
a stator with armature windings;
a rotor having a permanent magnet supported for rotation relative to the stator;
a variable speed drive connected to the rotor for rotating the rotor at an output rotational speed output by the variable speed drive;
a voltage and/or current sensor sensing voltage and/or current generated in the armature windings;
a rotational speed sensor sensing an input rotational speed of rotation that is input to the variable speed drive; and a control module disposed in communication with the armature windings and operatively connected to the variable speed drive to maintain constant output voltage as load changes by varying rotational speed of the rotor, the control module further configured to control the variable speed drive via a hydraulic pump and motor set command signal for controlling a ratio of the input rotational speed to the output rotational speed as a function of output of the voltage and/or current sensor and the rotational speed sensor, wherein the generator arrangement is exciterless, and wherein the rotor does not carry a rotating rectifier.

2. The generator arrangement as recited in claim 1, wherein the generator arrangement is a single stage generator arrangement.

3. The generator arrangement as recited in claim 1, wherein the generator arrangement is an integrated drive generator arrangement.

4. The generator arrangement as recited in claim 1, wherein the rotational speed sensor is coupled to the rotor and disposed in communication with the control module.

5. The generator arrangement as recited in claim 4, wherein the rotational speed sensor includes at least one of a resolver, a position sensing permanent magnet generator, a Hall Effect sensor, or a magnetic pickup.

6. The generator arrangement as recited in claim 1, wherein the variable speed drive includes an epicyclic differential coupled to the rotor.

7. The generator arrangement as recited in claim 6, further comprising a gas turbine engine operably connected to the rotor through the epicyclic differential.

8. The generator arrangement as recited in claim 1, wherein the variable speed drive includes a hydraulic pump and motor set coupled to the rotor and arranged to vary the output rotational speed of the rotor according to the input rotational speed and a predetermined voltage output target, wherein the input rotational speed is variable.

9. The generator arrangement as recited in claim 8, wherein the control module is operably connected to the hydraulic pump and motor set and arranged to drive output voltage to the output voltage target within 1.5 times a rated current output of the generator arrangement.

10. The generator arrangement as recited in claim 8, wherein the control module is operably connected to the hydraulic pump and motor set and arranged to allow output voltage to droop from the output voltage target between 1.5 times and 2.0 times a rated current output of the generator arrangement.

11. The generator arrangement as recited in claim 1, further comprising a power converter connected to the windings and arranged to convert power received therefrom into constant frequency alternating current power or direct current power.

12. The generator arrangement as recited in claim 11, wherein the voltage and/or current sensor is connected between the power converter and the armature windings to determine current drawn by an electrical load.

13. The generator arrangement as recited in claim 11, wherein the voltage and/or current sensor is connected between the power converter and an electrical load to determine current drawn by the electrical load.

14. The generator arrangement as recited in claim 1, wherein the permanent magnets are surface mounted to the rotor or embedded within an interior of the rotor.

15. A method of controlling a generator arrangement, comprising:
rotating at an output rotational speed, by a variable speed drive, a rotor with one or more permanent magnets relative to a stator;
generating electric current in armature windings fixed relative to the stator;
sensing voltage of the electric current generated n the armature windings;
sensing, at the variable speed drive, an input rotational speed that is input to the generator arrangement; and
changing rotational speed of the rotor via a hydraulic pump and motor set command signal for controlling a ratio of the input rotational speed to the output rotational speed as a function of the sensed voltage and the input rotational speed to maintain constant output voltage generated by the armature windings even as an electrical load connected to the generator arrangement changes.

16. The method as recited in claim 15, further comprising:
determining a difference between the sensed voltage and a target output voltage;
increasing or decreasing an electrical load connected to the armature windings; and
changing rotational speed of the rotor to maintain the difference between the sensed voltage and the target output voltage within a predetermined voltage range.

17. The method as recited in claim 15, further wherein the input rotational speed is a variable speed.

18. The method as recited in claim 15, further comprising converting the electric current into constant frequency alternating current power or direct current power.

19. A generator arrangement, comprising:
a stator with armature windings;
a rotor having a permanent magnet supported for rotation relative to the stator;
a variable speed drive connected to the rotor for rotating the rotor at an output rotational speed output by the variable speed drive, wherein the variable speed drive includes a hydraulic pump and motor set coupled to the rotor and arranged to vary rotational speed of the rotor according to a variable rotational speed input and a predetermined voltage output target;
a voltage and/or current sensor sensing voltage and/or current generated in the armature windings;
a rotational speed sensor sensing an input rotational speed of rotation that is input to the variable speed drive;
a control module disposed in communication with the armature windings and operatively connected to the variable speed drive to maintain constant output voltage as load changes by varying rotational speed of the rotor the control module further configured to control the variable speed drive via a hydraulic pump and motor set command signal for a ratio of the input rotational speed to the output rotational speed as a function of output of the voltage and/or current sensor and the rotational speed sensor, wherein the generator arrangement is exciterless, and wherein the rotor does not carry a rotating rectifier;
and
a power converter connected to the windings and arranged to convert power received therefrom into constant frequency alternating current power or direct current power.

* * * * *